United States Patent [19]

Uyama et al.

[11] 4,093,032

[45] June 6, 1978

[54] ELECTRONIC WEIGHING APPARATUS

[75] Inventors: Noboru Uyama, Osaka; Katsuaki Hara, Tondabayashi, both of Japan

[73] Assignee: Kubota Ltd., Osaka, Japan

[21] Appl. No.: 747,783

[22] Filed: Dec. 6, 1976

[30] Foreign Application Priority Data

Dec. 8, 1975 Japan .................................. 50-147147

[51] Int. Cl.² ...................... G01G 13/14; G01G 23/22
[52] U.S. Cl. ........................................ 177/165; 177/25
[58] Field of Search .................. 177/165, 25, 177, 178

[56] References Cited

U.S. PATENT DOCUMENTS

| | | | |
|---|---|---|---|
| 3,727,706 | 4/1973 | Streater et al. | 177/165 X |
| 3,786,881 | 1/1974 | Allan et al. | 177/165 X |
| 3,851,720 | 12/1974 | Williams, Jr. | 177/165 X |
| 3,869,005 | 3/1975 | Williams, Jr. et al. | 177/165 X |
| 4,029,162 | 6/1977 | Krolick et al. | 177/165 |

Primary Examiner—George H. Miller, Jr.
Attorney, Agent, or Firm—W. G. Fasse; W. W. Roberts

[57] ABSTRACT

An electronic weighing apparatus, comprising: a scale mechanism having a weighing plate for placing an article being weighed, said article having a net weight and including a packing having a tare weight, a pulse train generator operatively coupled to said weighing plate for generating a pulse train the number of which is associated with the weight of said article, a counter for counting the number of pulses of said pulse train for providing a weight value signal, a shift register responsive to said counter for storing the weight value signal in said counter, a tare weight display for displaying the weight value stored in said shift register, a net weight display responsive to said counter for displaying the weight value in said counter, a key board for setting the unit price of said thing, an operation circuit responsive to said key board and counter for making a multiplying operation of said unit price by said weight value in said counter for evaluating the price of said thing, a price display for displaying the price of said thing evaluated by said operation circuit, a tare weight deduction instructing switch to be depressed when only said tare is placed on said weighing plate for providing a reset signal for resetting said counter, said article being further placed on said weighing plate after said tare weight deduction instructing switch is depressed, and a gating circuit responsive to said tare weight deduction instructing switch for selectively introducing the weight value in said counter into said shift register before said tare weight deduction instructing switch is depressed and for selectively introducing the weight value in said counter into said article weight display and operation circuit after said tare weight deduction instructing switch is depressed, whereby the price to be obtained in conjunction with the weight of the tare is prevented from being displayed in initially setting the weight of the tare of an article in the apparatus.

8 Claims, 7 Drawing Figures

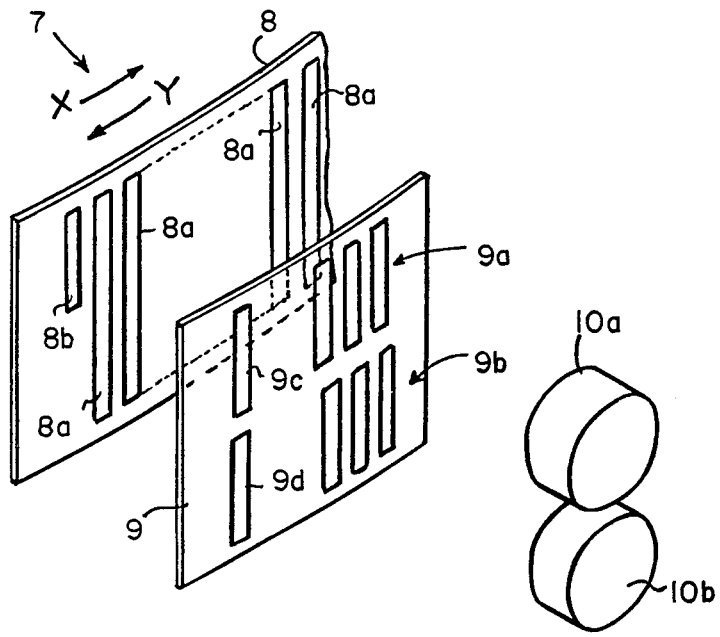
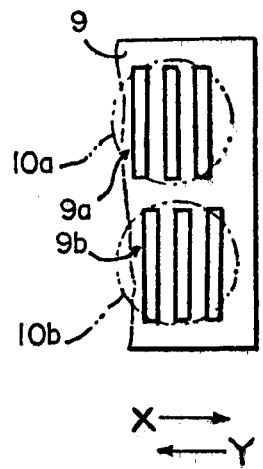
FIG. 3A
FIG. 3B
FIG. 4
(a) OUTPUT a FROM AMP 11
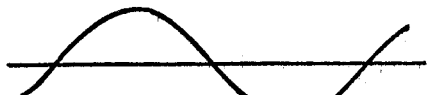
(b) OUTPUT b FROM AMP 13
(c) OUTPUT c FROM LEVEL DETECT 12
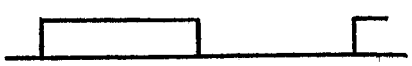
(d) OUTPUT d FROM LEVEL DETECT 14
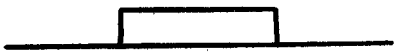
(e) OUTPUT e FROM PULSER 15
(f) OUTPUT f FROM PULSER 15

ELECTRONIC WEIGHING APPARATUS

BACKGROUND OF THE INVENTION:

1. Field of the Invention;

The present invention relates to an electronic weighing apparatus. More specifically, the present invention relates to an improved electronic weighing apparatus for evaluating the price of an article through multiplication of a preset unit price by the measured weight of the article for displaying the price in a digital manner, which has been adapted such that the price of only the net weight of the article is evaluated through deduction of the tare weight from the gross weight of the article.

2. Description of the Prior Art;

A conventional electronic weighing apparatus which has been put in practical use has been adapted to measure the weight of an article, evaluate the price of the article based on the measured weight and a unit price thereof set in advance, and display such data in a digital manner, thereby to provide both the seller and the purchaser with simplicity and accuracy of viewing the display, whether measurement is facilitated and trust is placed in each other. Typically, such an electronic weighing apparatus comprises a scale mechanism comprising a displacement member responsive to the weight of an article being weighed for causing displacement associated with the weight of the article, a pulse generator responsive to the displacement of the displacement member for providing a pulse train the number of which is associated with the displacement of the displacement member and thus with the weight of the article, each pulse corresponding to a predetermined weight, say 2 g, a counter for counting the number of pulses for evaluating the weight of the article, a key board for setting in advance the unit price of the article, an operation circuit for making a multiplying operation of the set unit price by the weight of the article for evaluating the price of the article, and a display for displaying the measured weight and the evaluated price of the article in a digital manner.

An article being weighed may be in a package or in a container having a tare weight. In such a case, a tare weight deduction is effected for the purpose of evaluating only the net weight of the thing rather than the gross weight of the thing including the tare weight. To that end, only the tare is first placed on the weighing plate of the apparatus to set the weight of the tare of an article in the apparatus, whereby only the weight of the tare is displayed by the display. In such a situation, a tare weight deduction instructing switch is depressed, thereby to reset the counter of the apparatus to zero, whereby display is made of zero with the tare placed on the weighing plate. Then, the goods are placed on the weighing plate to measure the net weight. Since the tare weight has been deducted as described previously, only the net weight of the article goods is evaluated.

As described previously, a typical prior art electronic weighing apparatus has been adapted such that the unit price of the article being weighed is set in advance and a multiplying operation is made of the set unit price by the ascertain weight of the article being weighed to evaluate the price of the article being weighed, whereby the price is displayed as well as the weight of the article being weighed. With such an electronic weighing apparatus, measurement of the weight and a multiplying operation of the unit price by the weight are similarly made of a tare, when a tare is first placed on the weighing plate of the apparatus for the purpose of initially setting the weight of the tare of an article in the apparatus. As a result, the weight of the tare and the price of a thing corresponding to the tare weight are displayed by the display after the tare is placed on the weighing plate of the apparatus until a tare weight deduction instructing switch is depressed. However, this could cause a customer to misunderstand as if the price obtained in conjunction with the tare were added to the net price of the thing obtained thereafter. As a result, display of such a tare weight and the price obtained based thereon makes a customer feel distrustful of the net weight measurement and the net price evaluation.

SUMMARY OF THE INVENTION:

The present invention relates to an electronic weighing apparatus, comprising: means responsive to the weight of an article being weighed for causing displacement associated with the weight of said article, said displacement means comprising means for placing said article, said article comprising a thing in a tare, means responsive to the displacement of said displacement means for providing an electrical signal associated with the displacement of said displacement means and thus with the weight of said article, means responsive to said electrical signal providing means for displaying the weight of said article, means for setting the unit price data of said article, means responsive to said unit price setting means and said electrical signal providing means for making a multiplying operation of said unit price data by said weight associated electrical signal for evaluating the price of said article, means responsive to said multiplying operation means for displaying the price of said article, means coupled to said electrical signal providing means for resetting said electrical signal providing means into an initial state, said resetting means being enabled when only a tare is placed on said article placing means of said displacement means, a thing being further placed on said article placing means of said displacement means after said resetting means is enabled, and means responsive to said resetting means for disabling said price display means before said resetting means is enabled.

Therefore, a principal object of the present invention is to provide an improved electronic weighing apparatus which deducts the weight of a tare of an article, whereby the price to be obtained in conjunction with the weight of the tare is prevented from being displayed by the initial setting of the tare weight of an article in the apparatus.

Another object of the present invention is to provide an improved electronic weighing apparatus which is capable of deducting the tare weight of an article, and of displaying the tare weight as initially set by a tare weight display and the net weight and the net price of a thing to be contained in the tare, are displayed by a separate display only after the tare weight has been deducted.

These objects and other objects, features, advantages, and aspects of the present invention will become more apparent from the following detailed description when taken in conjunction with the accompanying drawings.

BRIEF DESCRIPTION OF THE DRAWINGS:

FIGS. 3A and 3B are enlarged picturesque views of portions of the weighing scheme shown in FIG. 2;

FIG. 4 shows waveforms of electrical signals at various portions in the FIG. 2 diagram for use in explanation of the operation of the FIG. 2 embodiment, wherein the abcissa has been adapted to correspond with the displacement amount (angle) of a slit plate 8;

Figure 1:
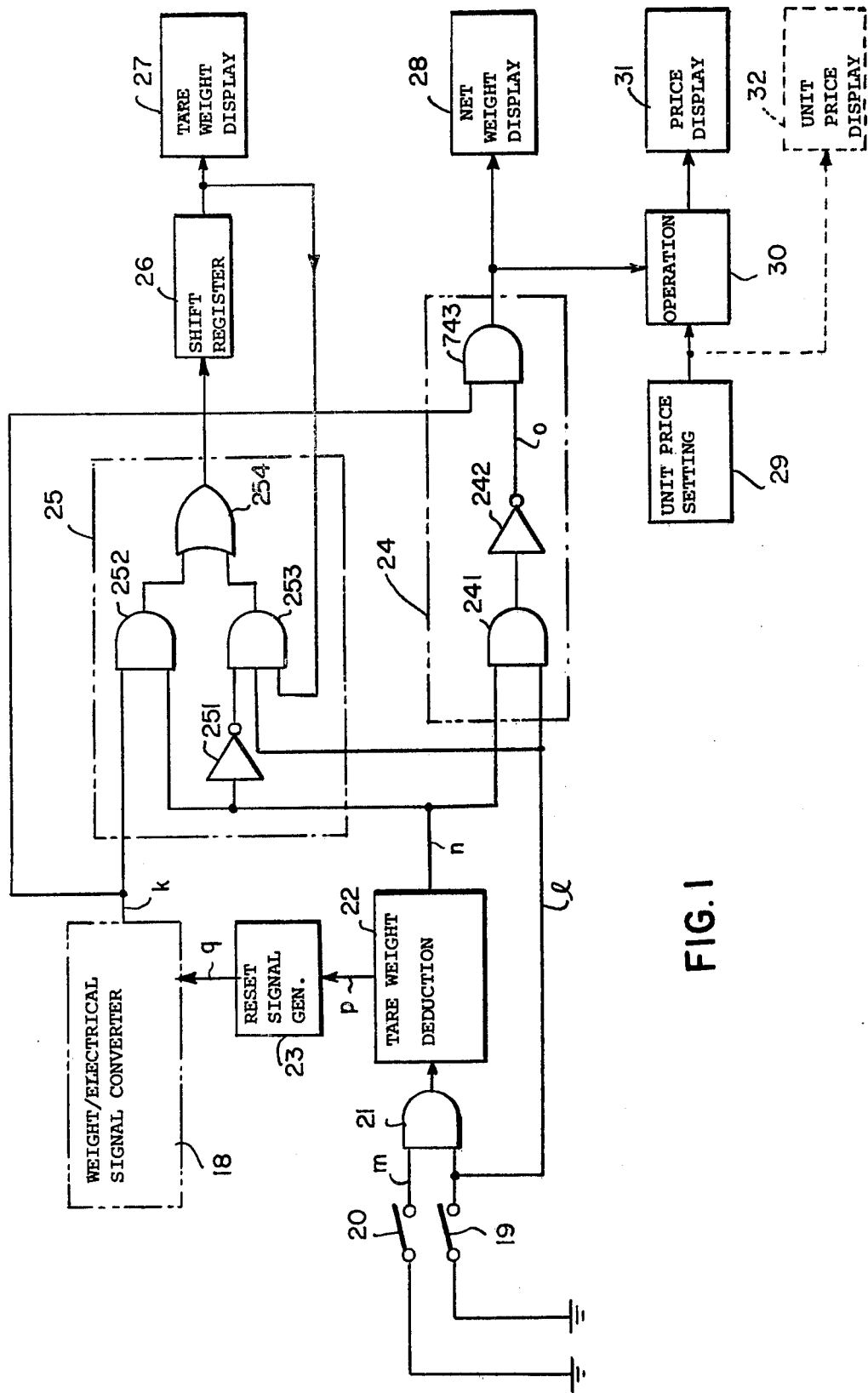
FIG. 1 is a block diagram of one embodiment of the present invention.

DESCRIPTION OF THE PREFERRED EMBODIMENT:

FIG. 1, illustrates an embodiment of the electronic weighing apparatus of the invention comprising a weight/electrical signal converting circuit 18, which serves to generate a weight associated electrical signal k responsive to the weight of an article being weighed on a weighing plate of the apparatus. The weight/electrical signal converting circuit 18 will first be described with reference to FIGS. 2, 3A and 3B.

Figure 2:
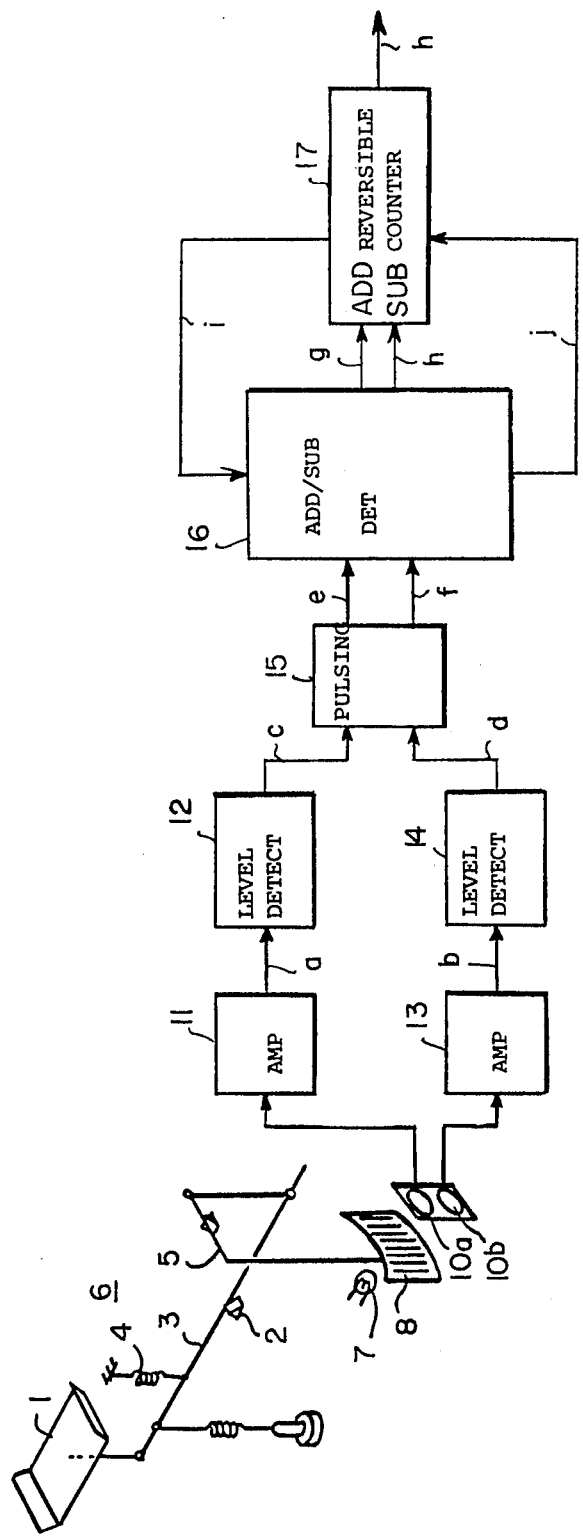
FIG. 2 is a block diagram showing in more detail the weight/electrical signal converting circuit 18 in the FIG. 1 embodiment.

Referring to FIG. 2, a weighing mechanism 6 comprises a weighing plate 1 for placing an article to be weighed (not shown), an arm 3 coupled to said weighing plate 1, and a blade 2 for supporting the arm 3. With the edge of the blade 2 as a supporting point, one side of the arm 3 is urged upward by a spring 4, while the opposite end of the arm 3 is coupled to one end of a lever 5. The lever 5 is also supported by means of another blade with the edge thereof as a supporting point. The opposite end of the lever 5 is coupled to a slit plate 8.

Referring to FIG. 3A, the slit plate 8 is formed of a plurality of slits 8a, 8a, . . . , equally spaced and extending in the vertical direction. The slit plate 8 comprises an additional slit 8b for use in the zero point detection. The length of slit 8b is one half of the above described slit 8a, 8a . . . , and extends in the vertical direction and equally spaced from the left side of the group of the slits 8a, 8a . . . , as viewed in FIG. 3A. A light source 7 is provided at the rear surface side of the slit plate 8 to emit light toward the slit plate 8 and another stationary slit plate 9 is provided at the front surface side of the slit plate 8, so that the light beam from the light source 7 is directed through the slit plates 8 and 9 in the direction perpendicular to the plates 8 and 9. The slit plate 8 may be made of a transparent glass plate, coated with an opaque material with the slit portions 8a, 8a, . . . , and 8b left uncoated so as to form transparent slits. Alternatively, the slit plate 8 may be an opaque plate such as a metal plate having elongated apertures 8a, 8a, . . . , and 8b therein.

The slit plate 9 has two groups of slits 9a and 9b, positioned in the upper and lower half portions of the slit plate 9, each slit being, for example, as wide as twice the width of the slits 8a and 8b formed in the slit plate 8 and extending in parallel with the slits 8a and 8b of the plate 8. The positional relation of the upper group of the slit 9a and the lower group of the slits 9b is selected such that the upper slits 9a are shifted by a pitch corresponding to a quarter of one cycle of the slit arrangement with respect to the lower slits 9b in the horizontal direction, as shown in FIGS. 3A and 3B. The shifted arrangement of the upper and the lower slits 9a and 9b is aimed to detect the direction of the movement of the weighing plate 1 of the scale mechanism 6. The slit plate 9 is further formed of additional slits 9c and 9d for zero point detection spaced apart leftward from the groups of the slits 9a and 9b side by side, respectively, by a given distance. The slits 9c and 9d are formed in substantially the same position in the horizontal direction. The slit plate 9 may also be made of a metallic opaque plate such as an aluminum plate having elongated apertures 9a, 9b, 9c and therein.

Two photodetectors 10a and 10b are provided at the front side of the plate 9 so as to receive the light beam transmitted by the light source through the slits of the slit plates 8 and 9. More specifically, the photodetector 10a is positioned so as to face the group of slits 9a, while the photodetector 10b is positioned so as to face the group of slits 9b, as shown in FIG. 3B. On the other hand, other two photodetectors (not shown) are positioned so as to face the slits 9c and 9d, respectively, for the purpose of zero point detection.

Referring again to FIG. 2, the outputs from the photodetectors 10a and 10b are coupled to the corresponding amplifiers 11 and 13, respectively. The outputs a and b from the amplifiers 11 and 13 are fed to level detectors 12 and 14, respectively, each comprising a Schmitt triggering circuit or the like. Each of these level detectors 12 and 14 is adapted to be responsive to each output from the corresponding photodetector 10a or 10b to level detect the output at a predetermined threshold level to provide a rectangle wave output. The outputs c and d from these level detectors 12 and 14 have a rectangular wave form and are both coupled to a pulsing circuit 15a comprising a differentiating circuit, for example. The pulsing circuit 15 is structured to be responsive to the respective outputs c and d to generate differentiated pulses at the leading and trailing edges of the respective outputs c and d, thereby to selectively provide incremental pulses e or decremental pulses f in accordance with an incremental (downward) or decremental (upward) movement of the weighing plate of the scale mechanism 6. The incremental pulses e and the decremental pulses f are applied to the inputs to an addition/subtraction detecting circuit 16. The addition/subtraction detecting circuit 16 is adapted to be responsive to the outputs from the pulsing circuit 15 to detect the direction of the movement, i.e. an incremental or a decremental direction, of the weighing plate 1 of the scale mechanism 6, thereby to detect addition or subtraction to be carried out in a reversible counter 17 and to provide a corresponding addition or subtraction pulse train g or h and a minus sign signal, as to be more fully described subsequently. The addition pulse g or the subtraction pulse h obtained from the addition/subtraction detecting circuit 16 is applied to an up count mode input ADD or a down count mode input SUB, respectively, of the reversible counter 17 for counting the number of pulses of the pulse train to provide a weight value in a digital manner. The output k from the reversible counter 17 comprising a coded signal representative of the measured weight value of the article is then applied to the subsequent stages, as to be described hereinafter. The addition/subtraction detecting circuit 16 is also adapted to receive a zero detected output i from the reversible counter 17 and to provide a signal j representative of the minus sign (−) of the data in the counter 17.

Returning again to FIG. 1, the weight associated electrical signal k from the weight/electrical signal converting circuit 18 is applied to one input to an AND gate 252 in a gating circuit 25 and to one input to an AND gate 243 in a gating circuit 24. The present electronic weighing apparatus is also provided with a mode selection switch 19 for selectively switching the operation mode of the apparatus to a tare weight deduction enabling mode or a tare weight deduction disabling mode, such switch 19 being preferably provided at a manually operable position on the casing of the inventive apparatus. Similarly, the present apparatus is further provided with a tare weight deduction instructing switch 20 for instructing tare weight deduction upon depression thereof. The mode selection switch 19 is closed when it is desired to enable the tare weight deduction enabling mode, whereby a signal *l* is brought to the high level, while the selection switch 19 is opened when it is desired to disable the tare weight deduction, whereby the signal *l* is brought to the low level. The tare weight deduction instructing switch 20 is closed when the tare weight should be deducted, whereby a signal m is brought to the high level, while the instructing switch 20 is opened when the tare weight need not be deducted, i.e. the gross weight should be measured, whereby the signal m is brought to the low level. The singal *l* is applied to one input to an AND gate 241 in the gating circuit 24 and to one input to an AND gate 253 in the gating circuit 25. The signals *l* and m are also applied to the inputs to an AND gate 21 and the output therefrom is applied to a tare weight deduction circuit 22.

The tare weight deduction circuit 22 will be described in detail with reference to FIG. 5. The tare weight deduction circuit 22 is responsive to the output from the AND gate 21 to be triggered or energized, thereby to provide tare weight deducting signals n and p. In other words, if and when the output from the AND gate 21 changes from the low level to the high level, the signal n changes from the high level to the low level and the signal p changes from the low level to the high level, and vice versa.

Figure 5:
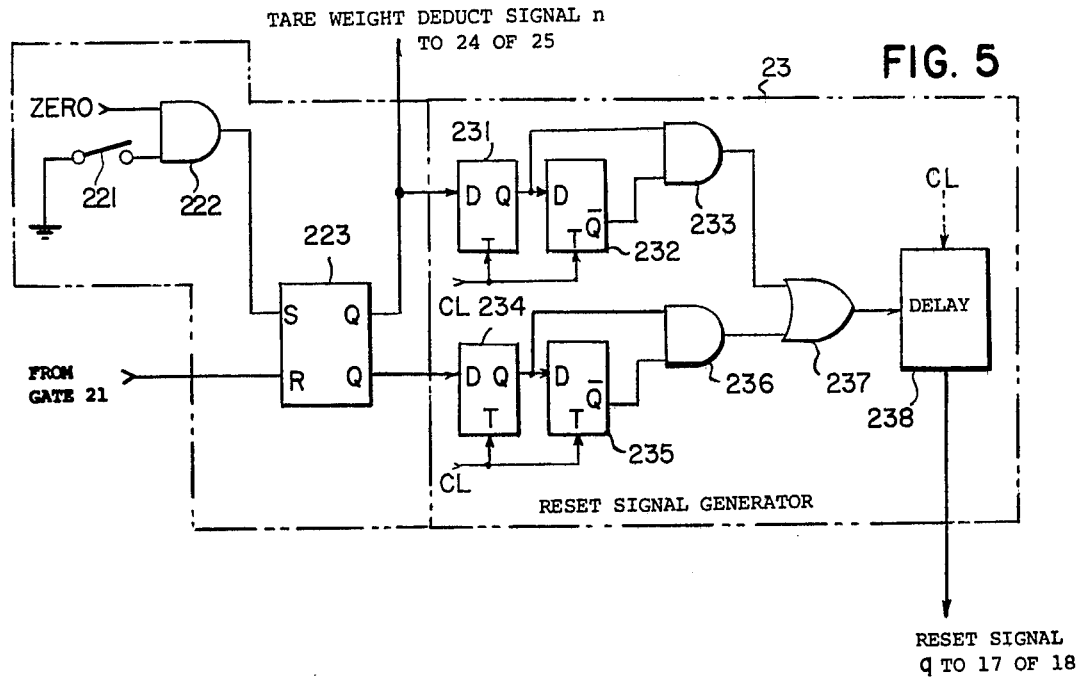
FIG. 5 is a block diagram showing in more detail a tare weight deduction circuit 22 and a reset signal generating circuit 23 in the FIG. 1 embodiment.

Referring to FIG. 5, the output from the AND gate 21 is applied to a reset input R of a flip-flop 223 in the tare weight deduction circuit 22. The set input of the flip-flop 223 is connected to receive the output from an AND gate 222 which is connected to receive a zero detected signal ZERO obtainable from the scale mechanism 6, as well known to those skilled in the art, and the output from a switch adapted to be closed upon turning on of the power supply of the apparatus, for example. The set output Q from the flip-flop 223 is withdrawn by way of the signal n and is also applied to the set input D of a D type flip-flop 231 in the reset signal generating circuit 23.

The set output Q from the D type flip-flop 231 is applied to the set input D of another D type flip-flop 232 provided in the subsequent stage. The output Q from the flip-flop 231 and the reset output Q from the flip-flop 232 are applied to the inputs to an AND gate 233. The reset output Q from the flip-flop 223 is applied to the set input D of a D type flip-flop 234 and the set output Q from the flip-flop 234 is applied to the set input D of another D type flip-flop 235 provided in the subsequent stage. The output Q from the flip-flop 234 and the reset output Q from the flip-flop 235 are applied to the inputs to an AND gate 236. The outputs from the AND gates 233 and 236 are applied through an OR gate 237 to the input to a delay circuit 238. The delay circuit 238 comprises a pulse counter, for example, adapted to be responsive to the output from the OR gate 237 to count the applied clock pulses CL to provide a reset signal q as a count up output whenever the count value reaches a predetermined value. In other words, the delay circuit 238 serves to provide a reset signal q after a delay of a predetermined time period required for switching by means of the gating circuits 24 and 25 after the output from the OR gate 237 becomes the high level, which reset signal q is applied to the reversible counter 17.

The gating circuit 25 serves to selectively apply the digital weight associated signal k to the shift register 26 or to form a recirculation register with the shift register 26 thereby to retain the information in a circulation manner. More specifically, the AND gate 253 is also connected to receive the output from the shift register 26 at the remaining input thereto. The outputs from the AND gates 252 and 253 are applied through an OR gate 254 to the shift register 26. The shift register 26 comprises 60 bit cells, for example, and is structured to be responsive to a clock pulse obtainable from a clock source, not shown, to make shifting operation. The output from the shift register 26 is further applied to a tare weight display 27, which may comprise a well known numerical value display tube, a display driver circuit, a display decoder, a display encoder and the like, as well known to those skilled in the art.

On the other hand, the gating circuit 24 serves to selectively apply or not apply the digital weight associated signal k to the weight display 28 and the operation circuit 30. More specifically, the output from the AND gate 241 is inverted by means of an inverter 242 and the inverted output signal o is applied to the other input to the AND gate 243. Accordingly, the weight associated signal k is allowed to pass therethrough or is inhibited from passing therethrough as a function of the signal o being the high level or the low level.

The operation circuit 30 is also adapted to receive a unit price signal obtained from the unit setting circuit 29, which may comprise a key board and an encoder, not shown. The key board comprises of at least 10 numeral keys for the numerals 0, 1, 2, 3 . . . 9, so that any numerical value for a desired unit price may be entered. The encoder is structured to encode the entered numerical value into a coded unit price signal in the manner well known to those skilled in the art. The operation circuit 30 is structured to make a multiplying operation of the set unit price by the measured weight value, i.e. the set unit price X the measured weight value, to evaluate the price of the article, which is applied to the price display 31. If desired, the unit setting circuit 29 may be coupled to a unit price display 32, as shown by the dotted line, to display the set unit price.

Before the detailed description of the embodiment shown, the operation of the scale mechanism 6 will first be described with reference to FIGS. 3A, 3B, and 4.

If and when an article being weighed (not shown) is placed on the top surface of the weighing plate 1 of the scale mechanism 6, the arm 3 is rotated anti-clockwise as viewed in FIG. 2 with the edge of the blade 2 as a supporting point, as the spring 6 extends in association with the weight of the article. The arm 3 continues to rock about the supporting point, as the rocking transient diminishes until the arm 3 becomes stabilized where the urging force of the spring caused by the weight of the article and the force of restitution of the spring becomes balanced. The upward displacement of the opposite end of the arm 3 causes the lever 5 to be rotated about the supporting point at the center thereof anti-clockwise as viewed in FIG. 2, which in turn causes the split plate 8 provided between the light source 7 and the photodetectors 10a and 10b to be displaced in the rightward direction as viewed in FIG. 2, which corresponds to an X arrow direction shown in FIG. 3B, and vice versa.

As the slit plate 8 is moved, the slits 8a, 8a, ... formed on the slit plate 8 permits the light beam from the light source 7 to be transmitted therethrough to the photodetectors 10a and 10b intermittently. As a result, the photodetectors 10a and 10b facing the upper and lower groups of the slits 9a and 9b, respectively, of the slit plate 9 generate a sine wave or sinusoidal output signals of the wave forms (a) and (b) in FIG. 4, respectively. It is understood that the output from one photodetector 10b and thus the output (b) from the amplifier 13 is out of phase or delayed or 90° with respect to the output from the other photodetector 10a and thus the output (a) from the amplifier 11. The reason is that the slits 9a of the upper slit group and the slits 9b of the lower slit group of the slit plate 9 provided opposite to the photodetectors 10a and 10b, respectively, have been displaced from each other by the pitch corresponding to a quarter of one cycle of the slits in the horizontal direction, which causes the timing relation of the light beam reaching the photodetectors 10a and 10b through the slit plates 8 and 9 to be out of phase in quadrature or by a quarter of one cycle.

The slit plate 8 is moved in the X arrow direction or in the Y arrow direction, as the weighing plate 1 of the scale mechanism 6 is moved in the downward direction or the upward direction, respectively, and thus the relative relation of the output signals from the respective photodetectors 10a and 10b is reversed in both situations. The reason why the phase is shifted by 90° as described above is that the direction of the movement of the weighing plate is to be detected by means of the pulsing circuit 15 and thus by the addition/subtractor detecting circuit 16 to determine the addition mode or the subtraction mode in terms of the weight by means of the reversible counter 17. The outputs a and b from the amplifiers 11 and 13 are fed to the level detectors 12 and 14, respectively. If and when the threshold values of these level detectors 12 and 14 are set to the zero level with respect to the outputs from the amplifiers 11 and 13, the rectangle wave forms c and d shown in FIG. 4 (c) and (d) are obtained from the level detectors 12 and 14, respectively.

Although not shown in detail, the pulsing circuit 15 is adapted to differentiate the rise and fall portions of the respective outputs c and d of the level detectors 12 and 14 by means of, for example, two differentiating circuits. Assuming that the slit plate 8 is moving in the X arrow direction, detection is made that the output d is the low level at the rise time of the output c and the output c is the high level at the rise time of the output d, whereas the output d is the high level at the fall time of the output c and the output c is the low level at the fall time of the output d, whereupon the incremental direction is judged and the pulse output from the said two differentiating circuits is adapted to be applied to one input to the addition/subtraction detecting circuit 16 by way of an incremental pulse train e, as shown in FIG. 4 (e). Conversely, if and when the slit plate 8 is moving in the Y arrow direction, detection is made that the mutual relation of the outputs c and d is directly opposite to the above described case, whereupon the decremental direction is judged and the pulse output from the two differentiating circuits is applied to the other input to the addition/subtraction detecting circuit 16 by way of a decremental pulse train f, as shown in FIG. 4 (f).

Figure 6:
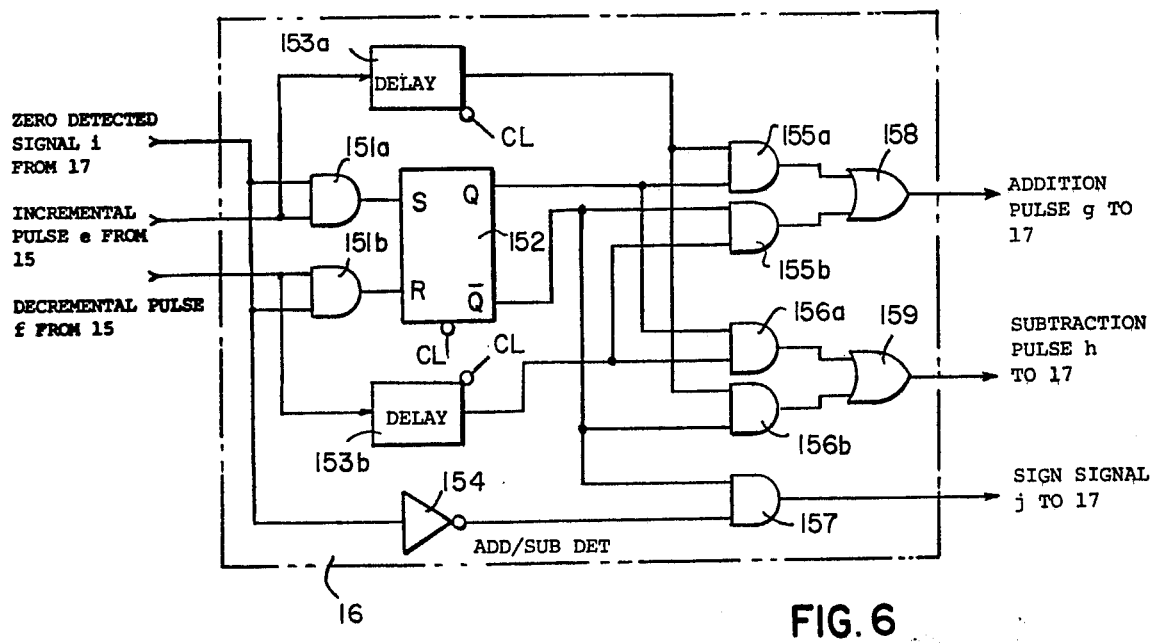
FIG. 6 is a detailed block diagram of an increment-/decrement detecting circuit 15 in the FIG. 1 diagram.

FIG. 6 is a block diagram showing in detail the addition/subtraction detecting circuit 16. Referring to FIG. 6, it will now be described how the state of addition or subtraction is determined. The incremental pulse output e from the pulsing circuit 15 is applied to one input of an AND gate 151a and is also applied to the input of a delay circuit 153a for the purpose of keeping the circuit operation synchronized. The decremental pulse output f from the pulsing circuit 15 is applied to one input of an AND gate 151b and is also applied to the input of a delay circuit 153b for the purpose of the circuit operation synchronized. The output from the AND gate 151a is applied to the set input S of a flip-flop 152 and the output from the AND gate 151b is applied to the reset input R of the flip-flop 152. The flip-flop 152 is triggered with the clock pulse CL and the set output Q of the flip-flop 152 is applied to one inputs of AND gates 155a and 156a, while the reset output Q̄ is applied to one inputs of AND gates 155b and 156b. The delay circuit 153a is triggered with the clock pulse CL and the output therefrom is applied to the other inputs of the AND gates 155a and 156b. The delay circuit 153b is similarly triggered with the clock pulse CL and the output therefrom is applied to the other inputs to the AND gates 155b and 156a. The outputs from these AND gates 155a and 155b are applied through an OR gate 158 to the reversible counter 17 by way of an addition pulse g, while the outputs from these AND gates 156a and 156b are applied through an OR gate 159 to the reversible counter 17 by way of a subtraction pulse h. The zero detected signal i obtainable when the contents in the reversible counter 17 are zero is applied to the other inputs to the AND gates 151a and 151b and is also applied, through an invertor 154, to the other inputs to the AND gate 157. The output from the AND gate 157 is applied to the reversible counter 17 by way of the sign signal j.

Now consider a case where the count value in the reversible counter 17, i.e. the measured weight value is zero. In such a situation the zero detected signal i is the high level and accordingly the AND gates 151a and 151b are enabled. Now assuming that the slit plate 8 of the scale mechanism 6 moves in the X arrow direction and an increment directional pulse e as shown in FIG. 4 (e) is obtained from the pulsing circuit 15, the flip-flop 152 is set in synchronism with the clock pulse CL and the set output Q becomes the high level, while the reset output Q̄ becomes the low level. Therefore, the AND gates 155a and 156a are enabled. At the same time, the pulse output is obtained from the delay circuit 153a in synchronism with the clock pulse CL. Accordingly, an addition pulse g is obtained from the AND gate 155a and thus from the OR gate 158. The addition pulse g is not shown in the drawing but is the same as the increment directional pulse e shown in FIG. 4 (e). Since the AND gate 157 has been disabled with the reset output Q̄ of the flip-flop 152 at that time, the sign signal j remains in the low level.

Now assuming that the slit plate 8 of the scale mechanism 6 moves in the Y arrow direction if and when the measured weight value is zero and a decrement directional pulse f as shown in FIG. 4 (f) is obtained from the pulsing circuit 15, the flip-flop 152 is reset in synchronism with the clock pulse CL and the set output Q of the flip-flop 152 becomes the low level, while the reset output Q of the flip-flop 152 becomes the high level. Therefore, the AND gates 155b and 156b and 157 are enabled. At the same time, a pulse output is obtained from the delay circuit 153b in synchronism with the clock pulse CL. Accordingly, the addition pulse g is obtained from the AND gate 155b and thus from the OR gate 158. Since the AND gate 157 has been enabled with the reset output Q of the flip-flop 152 in such a situation, the sign signal j is the high level, which indicates that the addition pulse g should be added in the negative direction.

Next consider a case where the count value in the reversible counter 17, i.e. the measured weight value is not zero (W ≠ 0). In such a situation the zero detected signal i is the low level and accordingly the AND gates 151a and 151b are disabled. Now assuming that the slit plate 8 of the scale mechanism 6 moves in the X arrow direction and the increment directional pulse e as shown in FIG. 4 (e) is obtained from the pulsing circuit 15, the addition pulse g is obtained from the AND gate 155a and thus from the OR gate 158 if and when the flip-flop 152 has been set, whereas the subtraction pulse h is obtained from the AND gate 156a and thus from the OR gate 159 if and when the flip-flop 152 has been reset. On the other hand, assuming that the slit plate 8 of the scale mechanism 6 moves in the Y arrow direction in such situation where the measured weight value is not zero, i.e. W ≠ 0 and the decrement directional pulse f as shown in FIG. 4 (f) is obtained from the pulsing circuit 15, the addition pulse g is obtained from the AND gate 155a and thus from the OR gate 158 if and when the flip-flop 152 has been set, whereas the subtraction pulse h is obtained from the AND gate 156b and thus from the OR gate 159 if and when the flip-flop 152 has been reset. It will be understood that in such a situation the sign signal j is the high level only if and when the zero detected signal i is the high level and the decrement directional pulse f is received. Thus, the addition pulse g and the subtraction pulse h and the sign (−) signal j are obtained from the addition/subtraction detecting circuit 16.

In operation, for the purpose of energization of the present apparatus, a power switch, not shown, for example, is turned on. Accordingly, the switch 221 shown in FIG. 5 is closed and the high level output is obtained from the switch 221. Assuming that nothing has been placed on the scale mechanism 6 and hence the scale mechanism 6 has returned to the mechanical zero point position, the zero point signal ZERO is in the high level and hence the output from the AND gate 222 is the high level. Accordingly, the flip-flop 223 is set and the set output Q becomes the high level, while the reset output Q becomes the low level. Therefore, the D type flip-flop 231 is triggered with the first clock pulse CL and the set output Q therefrom becomes the high level. At that time the input to the D type flip-flop 232 remains the low level and the reset output Q therefrom is the high level at the timing of the first clock pulse CL. Nevertheless, the input to the D type flip-flop 232 becomes the high level at the following clock pulse CL, and the output Q therefrom is the low level. The AND gate 233 provides the high level signal only during one clock pulse period, which high level signal is applied through the OR gate 237 to the delay circuit 238 to trigger the same. Accordingly, the delay circuit 238 provides a reset signal q after a given delay, as described previously. Accordingly, the reversible counter 16 in the weight/electrical signal converting circuit 18 is reset to the initial state or zero.

It is appreciated that the mode selection switch 19 is turned on or off depending upon whether it is desired to make tare weight deduction or not. In the following, the tare weight deduction mode in accordance with the present invention will be described.

If and when it is desired to make a tare weight deduction, the mode selection switch 19 is turned on. Accordingly, the signal l from the switch 19 becomes the high level. Therefore, the AND gate 241 in the gating circuit 24 is enabled and the AND gate 252 in the gating circuit 25 is also enabled. Since the signal n from the tare weight deduction circuit 22 is the high level at the initial state, as described previously, the inverted low level signal inverted by the inverter 251 serves to disable the AND gate 253. Since the signal n is the high level, the high level output is obtained from the AND gate 241. Accordingly, the output 0 from the inverter 242 becomes the low level and the AND gate 243 is disabled.

In such a situation, only a tare weight is placed on the weighing plate 1 of the scale mechanism 6. Accordingly, the weight associated signal k representative of the weight of the tare is obtained from the reversible counter 17 in the weight/electrical signal converting circuit 18 in accordance with the operation described previously. Since the AND gate 252 has been enabled and the AND gate 243 has been disabled at that time, the weight associated signal k is applied through the AND gate 252 and the OR gate 254 only to the shift register 26. Therefore, the tare weight is displayed only by the tare weight display 27. In other words, the tare weight value is prevented by the AND gate 243 from being applied to the net weight display 28 and the operation circuit 30. Thus, the net weight display 28 and the net price display 31 keep displaying zero.

Now the tare weight deduction instructing switch 20 is turned on for the purpose of deducting the tare weight. As a result, the signal m from the switch 21 becomes the high level and the output from the AND gate 21 also becomes the high level. Therefore, the flip-flop 223 in the tare weight deduction circuit 22 is reset and the reset output Q becomes the high level. In such a situation, the flip-flop 223 will not be set, unless the scale mechanism 6 returns to the zero point thereafter. In other words, the flip-flop 223 remains reset to provide the high level output from the reset output Q, how many times the tare weight deduction instructing switch is depressed, unless the scale mechanism 6 returns to the zero point. This means that only a single tare weight deduction is permitted for each measurement.

When the flip-flop 223 is reset, the set output Q turns to the low level and the signal n becomes the low level. Therefore, the AND gate 252 is disabled and the AND gates 253 and 243 are enabled. Accordingly, the shift register 26, the AND gate 253 and the OR gate 254 constitute a recirculation register, thereby to retain thereafter the tare weight signal loaded previously in the shift register 26. Hence, the tare weight display 27 keeps displaying the tare weight. Since the AND gate 243 is enabled, the weight associated signal k is allowed to be applied thereafter to the net weight display 28 and the operation circuit 30. In other words, only after the tare weight deduction is performed, the gating circuit 24 is enabled to apply the weight associated signal k to the net weight display 28 and the operation circuit 30.

On the other hand, after the reset output Q of the flip-flop 223 becomes the high level, the D type flip-flop 234 is triggered with the first clock pulse CL and the set output Q therefrom turns to the high level. At that time, the input to the D type flip-flop 235 remains in the low level and hence the reset output Q therefrom remains in the high level at the timing of the first clock pulse CL. The input of the D type flip-flop 235 becomes the high level at the timing of the subsequent clock pulses CL and hence the reset output Q turns to be the low level. Therefore, the high level signal is obtained from the AND gate 236 only for one clock pulse period. This high level signal from the AND gate 236 is applied through the OR gate 237 to the delay circuit 238 to trigger the same. Accordingly, the delay circuit 238 provides a reset signal $q$ after a predetermined delay time, as described previously. Accordingly, the reversible counter 17 in the weight/electrical signal converting circuit 18 is reset to the initial state or to zero. Therefore, the net weight display 28 displays zero at that time and accordingly the price display 31 also displays zero. The unit price display 32 displays the set unit price of the article, however.

Now that the tare weight deduction has been performed, an article to be contained in a packing having a tare weight is further placed on the weighing plate 1 of the scale mechanism 6. In such a situation, the reversible counter 17 has been reset to zero. Therefore, the counter 17 provides the weight associated signal $k$ representative of only the net weight of the thing, when the thing is placed on the weighing plate 1. The weight associated signal $k$ representative of only the net weight of the thing is applied to the net weight display 28 and the operation circuit 30. Thus, the net weight of the article is displayed by the net weight display 28. At the same time, a multiplying operation is made by means of the operation circuit 30 of the unit price data obtained from the unit price setting circuit 29 by the net weight of the article obtained from the reversible counter 17, thereby to evaluate the net price of the article. The net price of the article thus evaluated is displayed by the net price display 31.

In the foregoing, the operation mode where the tare weight deduction is performed was described. In case where it is not desired to deduct the tare weight, the mode selection switch 19 is turned off. Accordingly, the AND gate 254 is disabled and the AND gate 243 is enabled. Therefore, the weight associated signal $k$ from the reversible counter 17 is not applied to the shift register 26 and instead is applied to the net weight display 28 and the operation circuit 30. Accordingly, the weight is displayed by the display 28 and the price is operated by the operation circuit 30 and is displayed by the display 31.

It would be apparent to those skilled in the art that the weight/electrical signal converting circuit 18 may employ a load cell combined with an analog/digital converter, a weight coded plate associated with the weighing plate 1 of the scale mechanism 6 for directly providing a weight associated digital coded signal, or the like. It is also appreciated that although the tare weight deduction circuit 22 and the reset signal generating circuit 23 were described with reference to specific embodiments, the present invention is not limited to such specific embodiments. It is further appreciated that although the embodiment shown was adapted such that at least the price display is disabled before the tare weight deduction is performed, by preventing the data from being applied to the operation circuit 30 by the use of the AND gate 243 the price data can be prevented from being applied to the price display 31 by the use of a gating circuit to be provided between the operation circuit 30 and the price display 31. Besides the foregoing, it would be possible for those skilled in the art to make various modifications and changes of the embodiments shown, without departing from the spirit of the present invention. Hence, it is contemplated that the spirit and scope of the present invention should be limited only by the terms of the appended claims.

What is claimed is:

1. An electronic weighing apparatus for weighing an article in a packing, which packing constitutes a tare weight, comprising: displacement means responsive to the weight of an article being weighed for causing a displacement associated with the weight of said article, said displacement means comprising means for placing said article thereon, electrical signal providing means responsive to the displacement of said displacement means for providing an electrical signal associated with the displacement of said displacement means and thus with the weight of said article, weight display means responsive to said electrical signal providing means, for displaying the weight of said article, means for setting the unit price data of said article, multiplying means responsive to said unit price setting means and to said electrical signal providing means for multiplying said unit price data by said weight associated electrical signal for evaluating the price of said article, price display means responsive to said multiplying means for displaying the price of said article, resetting means coupled to said electrical signal providing means for resetting said electrical signal providing means into an initial state, said resetting means being enabled when only a tare weight is placed on said article placing means of said displacement means, an article without the packing being further placed on said article placing means of said displacement means after said resetting means is enabled, disabling means responsive to said resetting means for disabling said price display means before said resetting means is enabled, wherein said disabling means if further responsive to said resetting means for also disabling said weight display means before said resetting means is enabled, said apparatus further comprising shift register memory means responsive to said resetting means for storing said weight associated electrical signal representative of tare weight before said resetting means is enabled, means responsive to said memory means for displaying said tare weight, and means responsive to said resetting means for selectively applying said weight associated electrical signal to said shift register means only before said resetting means is enabled.

2. An electronic weighing apparatus in accordance with claim 1, wherein said disabling means comprises means responsive to said resetting means for preventing the output from said weight associated electrical signal providing means from being applied to said operation means before said resetting means is enabled.

3. An electronic weighing apparatus in accordance with claim 1, which further comprises means for selectively making said resetting means operative or not.

4. An electronic weighing apparatus for weighing an article in a packing, which packing constitutes tare weight, comprising: displacement means responsive to the weight of an article being weighed for causing a displacement associated with the weight of said article, said displacement means comprising means for placing said article thereon, electrical signal providing means responsive to the displacement of said displacement means for providing an electrical signal associated with the displacement of said displacement means and thus with the weight of said article, weight display means responsive to said electrical signal providing means, for displaying the weight of said article, means for setting the unit price data of said article, multiplying means responsive to said unit price setting means and to said electrical signal providing means for multiplying said unit price data by said weight associated electrical signal for evaluating the price of said article, price display means responsive to said multiplying means for displaying the price of said article, resetting means coupled to said electrical signal providing means for resetting said electrical signal providing means into an initial state, said resetting means being enabled when only a tare weight is placed on said article placing means of said displacement means, an article without the packing being further placed on said article placing means of said displacement means after said resetting means is enabled, disabling means responsive to said resetting means for disabling said price display means before said resetting means is enabled, and wherein said resetting means comprises tare weight deduction instructing switch means to be operated when only a tare weight is placed on said article placing means of said displacement means, enabling means responsive to the operation of said tare weight deduction instructing switch means for providing an enabling signal for enabling said disabling means, and clear signal means further responsive to the operation of said tare weight deduction instructing switch means for providing a clear signal for clearing said weight associated electrical signal providing means.

5. An electronic weighing apparatus in accordance with claim 4, wherein said clear signal providing means is adapted to provide a clear signal after said disabling means is enabled in response to said enabling signal.

6. An electronic weighing apparatus in accordance with claim 4, wherein said enabling signal providing means comprises state store means responsive to said tare weight deduction instructing switch means being operated for assuming a first state.

7. An electronic weighing apparatus in accordance with claim 6, which further comprises means for detecting said displacement means having returned to an initial state, and wherein said state store means is adapted to be responsive to said initial state detecting means for assuming a second state.

8. An electronic weighing apparatus for weighing an article in a packing, which packing constitutes a tare weight, comprising displacement means responsive to the weight of an article being weighed for causing a displacement associated with the weight of said article, said displacement means comprising means for placing said article thereon, electrical signal providing means responsive to the displacement of said displacement means for providing an electrical signal associated with the displacement of said displacement means and thus with the weight of said article, weight display means responsive to said electrical signal providing means, for displaying the weight of said article, means for setting the unit price data of said article, multiplying means responsive to said unit price setting means and to said electrical signal providing means for multiplying said unit price data by said weight associated electrical signal for evaluating the price of said article, price display means responsive to said multiplying means for displaying the price of said article, resetting means coupled to said electrical signal providing means for resetting said electrical signal providing means into an initial state, said resetting means being enabled when only a tare weight is placed on said article placing means of said displacement means, an article without the packing being further placed on said article placing means of said displacement means after said resetting means is enabled, disabling means responsive to said resetting means for disabling said price display means before said resetting means is enabled, wherein said disabling means is further responsive to said resetting means for also disabling said weight display means before said resetting means is enabled, said apparatus further comprising shift register memory means responsive to said resetting means for storing said weight associated electrical signal representative of the tare weight before said resetting means is enabled, means responsive to said memory means for displaying said tare weight, further means responsive to said resetting means for selectively applying said weight associated electrical signal to said shift register means only before said resetting means is enabled, and wherein said resetting means comprises tare weight deduction instructing switch means to be operated when only a tare weight is placed on said article placing means of said displacement means, enabling means responsive to the operation of said tare weight deduction instructing switch means for providing an enabling signal for enabling said disabling means, and clear signal means further responsive to the operation of said tare weight deduction instructing switch means for providing a clear signal for clearing said weight associated electrical signal providing means.

* * * * *